June 27, 1944.　　　W. M. BISHOP　　　2,352,158
DEEP SEA APPARATUS HOUSING
Filed April 21, 1942　　　3 Sheets-Sheet 3

INVENTOR
W. M. BISHOP
BY
O. E. Rasmussen
ATTORNEY

Patented June 27, 1944

2,352,158

UNITED STATES PATENT OFFICE 2,352,158

DEEP-SEA APPARATUS HOUSING

Walter M. Bishop, Flushing, N. Y., assignor to Bell Telephone Laboratories, Incorporated, New York, N. Y., a corporation of New York Application April 21, 1942, Serial No. 439,881

23 Claims. (Cl. 174—14)

This invention relates to deep-sea apparatus housings adapted to be connected into deep-sea communication cables and to be laid with the cable on the sea bottom, the housings being adapted to enclose and protect delicate electrical apparatus, such as repeaters for voice and carrier frequency currents.

It is a principal object of the invention to provide a deep-sea housing for electrical apparatus, which may be inserted in the cable before laying on the sea bottom and which is so designed that it may be payed out with the cable from the cable ship without injury to the apparatus within the housing.

It is a further object of the invention to provide means and arrangements for the mounting of the apparatus within the housing in such a manner that the apparatus will not be subjected to strains or pressures when the housing is flexed during the laying operation and so that the apparatus will efficiently utilize the space within the housing and may be interconnected by simple connections.

It is a further object of the invention to establish conditions within the housing by which the life of the apparatus may be prolonged.

The invention is closely related to cable housings such as those disclosed in the following United States Patents: 2,110,457 issued to J. F. Wentz on March 8, 1938; 2,158,492 issued to W. M. Bishop on May 16, 1939; 2,261,613 issued to W. M. Bishop on November 4, 1941.

Repeater housings of this type are usually made in the form of an elongated cylindrical chamber with an impervious wall of metal sufficiently rigid to withstand the sea pressure and having an entrance gland at each end. The central conductor of the cable circuit is passed through a series of insulating bushings or seals of effective construction and located in the center of the entrance gland and is connected to the apparatus within the housing; the return path is established by a connection from the apparatus within the housing to the outer metal parts of the gland and from there to the sea water and the outer armoring.

The cylindrical housing is made sufficiently flexible to permit it to follow the curvature of the brake drum on the cable ship during laying; since the housing usually has a greater diameter than the cable, a build-up or filler is provided for gradually tapering the diameter from that of the housing to that of the cable and the outer armoring is evenly applied over the entire assemblage so that the paying out operation may proceed smoothly.

Each end gland for the housing is made up as a sealing chamber having at its inner end a substantially rigid and impervious insulating seal for the inner portion of the central conductor, and having at its outer end a semirigid or semielastic insulating seal for the outer portion of the central conductor; the enclosed chamber between the two seals is filled with a fluid insulating compound.

An outer reservoir of liquid insulating compound is provided external of the end gland and in cooperation with the outer elastic insulating seal. This reservoir, being under sea pressure, will fill accidental crevices or voids in the insulating material of the outer elastic seal. The reservoir is in the form of a long tube surrounding a portion of the cable core connected to the outer seal. The space between the cable core and this tube or core sleeve is filled with a liquid compound and the distant end of the reservoir is closed by a suitable sleeve, which may be of rubber. With this arrangement a path which may be several feet long is provided for delaying the ingress of sea water into the sealing structure.

In the preferred form of the housing the flexible cylindrical wall of the chamber is constructed of an inner tubular element capable of withstanding deep-sea pressures and of an outer pliable jacket or sheathing, impervious to deep-sea water and supported at all points by the inner element of the cylindrical wall. For the purpose of securing flexibility and strength, the inner tubular element is built up of a series of overlapping or telescoped steel rings, forming a substantially continuous tubular wall for supporting the outer pliable sheathing.

The entire housing structure for insertion in a cable may be considered as being composed of three units, the housing chamber with its enclosed apparatus and with its ends closed by the inner rigid and impervious seal of the end gland, and two stub cables, each for connection at one end to the submarine cable and each terminating at the other end in the semirigid insulating seal portion of the entrance gland.

In accordance with a feature of the invention, the flexibility of the stub-cable units at each end of the housing is increased by providing a series of transverse corrugations in the core sleeve, forming the outer reservoir referred to above, the corrugations more specifically being provided at the end of the sleeve which is attached to the outer elastic seal of the entrance gland.

For the transmission of voice or carrier frequency currents over a long ocean cable, a large number of repeaters may be required operating in tandem along the cable. It has been proposed to supply the energy to the repeaters through the central cable conductor as a direct current passing through successive repeaters in series. Suitable circuits for this purpose have been disclosed in United States patents: 2,020,297, issued to Buckley et al. on November 12, 1935; 2,020,875, issued to Burton on November 12, 1935.

With such a series arrangement of the repeaters, the repeater apparatus may in some cases be normally connected to voltages as high as one or two thousand volts. For this reason it is important that the repeater apparatus be carefully insulated from the metal casing of the repeater housing and that all connections between the apparatus of a given repeater be similarly protected. For this purpose all the repeater apparatus and interconnections in a given housing are enclosed in a long tubular container of insulating material.

In accordance with a feature of the invention the insulating apparatus container is sectionalized and the sections of the container are connected together in such a manner that the entire container may be flexed together with the metal casing of the housing when the housing is passed around the brake drum during laying of the cable. The apparatus container is generally of a somewhat smaller diameter than the inner diameter of the steel casing and has narrow ridge portions at spaced intervals along its length for centering of the container and its various sections, the ridge portions fitting closely into the steel casing. Thus the body portion of the container provides freedom for the flexing of the housing and the ridges provide necessary friction against the steel casing so that the casing and the apparatus container will partake as a unit in the movements of the housing and the cable, as in the case of spinning.

In accordance with another feature of the invention, the various repeater apparatus are distributed in the different sections of the apparatus container and are held tightly in position between end discs at each end of the individual sections. Flexible bus-bar connections are provided between sections for interconnection of apparatus therein. Due to the fact that the steel casing and the apparatus container are sectionalized, the advantage is secured that the container may be progressively built up, as from one end to the other, and the steel casing may be similarly built up simultaneously with the container.

In accordance with a more specific feature of the invention adjacent sections of the container are mechanically connected together by means of a short helical spring and the spring pressure is taken up at each end of the housing by a special end-section of the apparatus container which rests directly against the rigid seal of the end gland.

With the object of securing a long life of the repeater apparatus and housing, it is important that the interior of the housing be conditioned in such a manner that harmful gases will not be developed and that electrolytic action between dissimilar materials will not take place due to moisture in the atmosphere.

In accordance with a further feature of the invention all the materials and especially the insulating materials which are exposed to the atmosphere within the housing unit, are chosen to remain physically and chemically stable for long periods of years and to not give off harmful gases as they age. The interior of the housing unit is furthermore subjected to prolonged evacuation for removal of substantially all traces of moisture from the apparatus surfaces and the surfaces of the casing, and the space is thereafter filled with an inert gas.

In accordance with another feature of the invention, one section of the apparatus container includes a drier unit containing a drying agent for absorbing moisture from the atmosphere under operating conditions. The drying agent is not exposed to the atmosphere within the casing until immediately before the housing unit is completely sealed up.

In accordance with a more specific feature of the invention, a humidity observing unit is provided within the casing for observation of the humidity during conditioning of the atmosphere within the casing.

Other objects and features of the invention will appear from the following detailed description of a specific preferred embodiment of the invention. In the following detailed description, reference will be made to the accompanying drawings in which.

Figure 1:
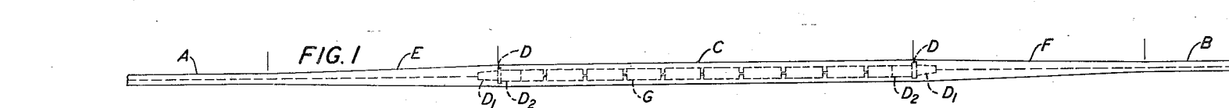
Fig. 1 is a schematic view of a cable housing inserted between two cable ends.

Referring now particularly to Fig. 1, a submarine cable A is interconnected with a submarine cable B by means of a housing C and intermediate connecting cable sections or stub cables E and F. This figure shows in dotted outline the sectionalized apparatus container G within the housing section C and also the entrance gland D at each end of the housing, each including the outer elastic cable seal $D_1$ and the inner rigid housing seal $D_2$.

The details of the entrance gland D have been fully described in the Patent 2,261,613 referred to above and will therefore only be described herein to such an extent as is required for a proper understanding of the invention and its operation.

Figure 2:
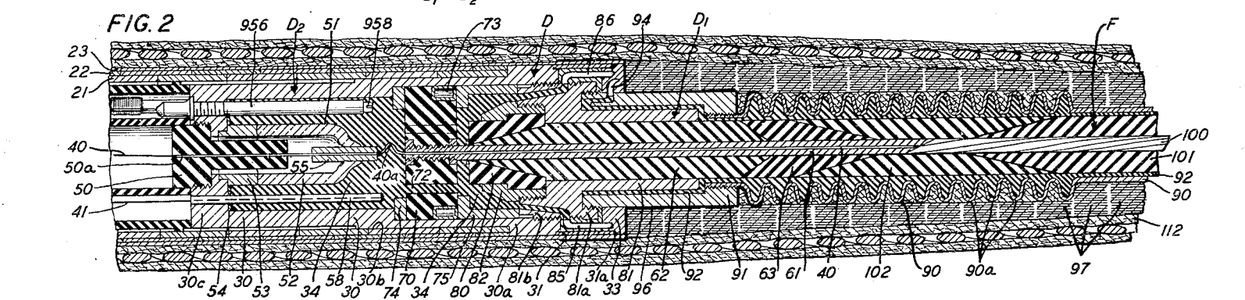
Fig. 2 is a longitudinal sectional view of an end gland inserted in one end of the housing and in complete operating condition.

As shown more in detail in Fig. 2, the cable housing is built up of a plurality of heavy steel rings 21, placed side by side in abutting relation to form an inner cylindrical wall; these rings are kept in mutual alignment by means of a series of outer, lighter steel rings 22 overlapping the inner rings, thereby forming the cylindrical wall of the housing of sufficient strength to withstand deep-sea pressures. An outer continuous water-impervious copper sheathing 23 is placed over the entire length of the steel wall and projects a short distance beyond the steel rings at each end of the housing; the copper sheathing is thin and sufficiently pliable to bend sufficiently during the paying-out operation of the housing and cable to conform to the curvature of the brake drum.

The inner rigid end seal $D_2$ comprises an end plug 30 made of brass, being generally of cylindrical shape and having an outer shoulder portion 30a for engagement with the end rings of the steel wall. The shoulder portion 30a has an outer diameter such that it fits snugly into the copper sheathing 23. A shouldered portion 30b of the end plug fits snugly inside the heavy steel rings 21. An end ring 31 of steel is brazed to the outer end of the plug 30 and after the end plug has been placed in position within the copper sheathing, the end ring 31 is brazed to the inside surface of the copper sheathing 23 at the point 31a, thereby keeping all the steel rings in mutual engagement and locking the end plug in position. The end-plug 30 has a bottom portion or end wall 30c with an opening for an end-bushing 50 of insulating material screwed into the bottom portion 30c. The bushing 50 has a small bore 50a for passing of the central lead-out wire 40 from the apparatus container G to the outer parts of the seal.

The end plug 30 forms a hollow sealing chamber 34 and includes the inner rigid insulating seal 51 for passage of the inner lead-in conductor 40.

The first requirement of the inner insulating seal is imperviousness to water vapor, as regards both the insulating substance proper and its sealing into the metal parts of the end-gland.

It is furthermore required that the inner insulating seal be capable of withstanding the sea pressure at least for a reasonably long time, to add materially to the life of the gland even after breakdown of the outer elastic seal $D_1$.

Glass of certain types has been found suitable for this purpose, in combination with certain metals or alloys which permit wet-sealing with the glass. Such combinations of "Kovar" metal and glass, for example borosilicate or lead glass, have been described in United States Patent 1,942,260 issued on January 2, 1934, to Howard Scott. Thus a sealing element may be made by proper heat treatment of a glass tube with "Kovar" rings or sleeves imperviously sealed thereto at opposite ends and the sealing element thus will present metal parts for attachment to the metal parts of the end gland simply and safely by soldering.

In the present embodiment the non-impervious inner seal 51 is formed of a glass insulator 52, substantially of tubular form, the inner end of which is directly sealed to a ring 53 of "Kovar" metal which in turn is seated by a shoulder portion in the bottom part 30c of the end plug. The ring 53 is imperviously sealed to the bottom piece 30c by means of solder 54. The outer end of the glass tube 52 is reduced in diameter and is sealed directly to a sealing sleeve 55 of "Kovar" metal; the lead-out wire 40 is threaded through the small bore of the sleeve 55 and is soldered therein to form an impervious seal.

A hollow ground post 58 of copper is screwed into the bottom piece 30c and soldered thereto by means of the soldering seal 54, already referred to; the return conductor 41 from the apparatus G within the housing is threaded through the post 58 and soldered thereto at the end of the post to form an impervious seal.

Figures 5, 6, 6A, 7, 8, 9, 10:
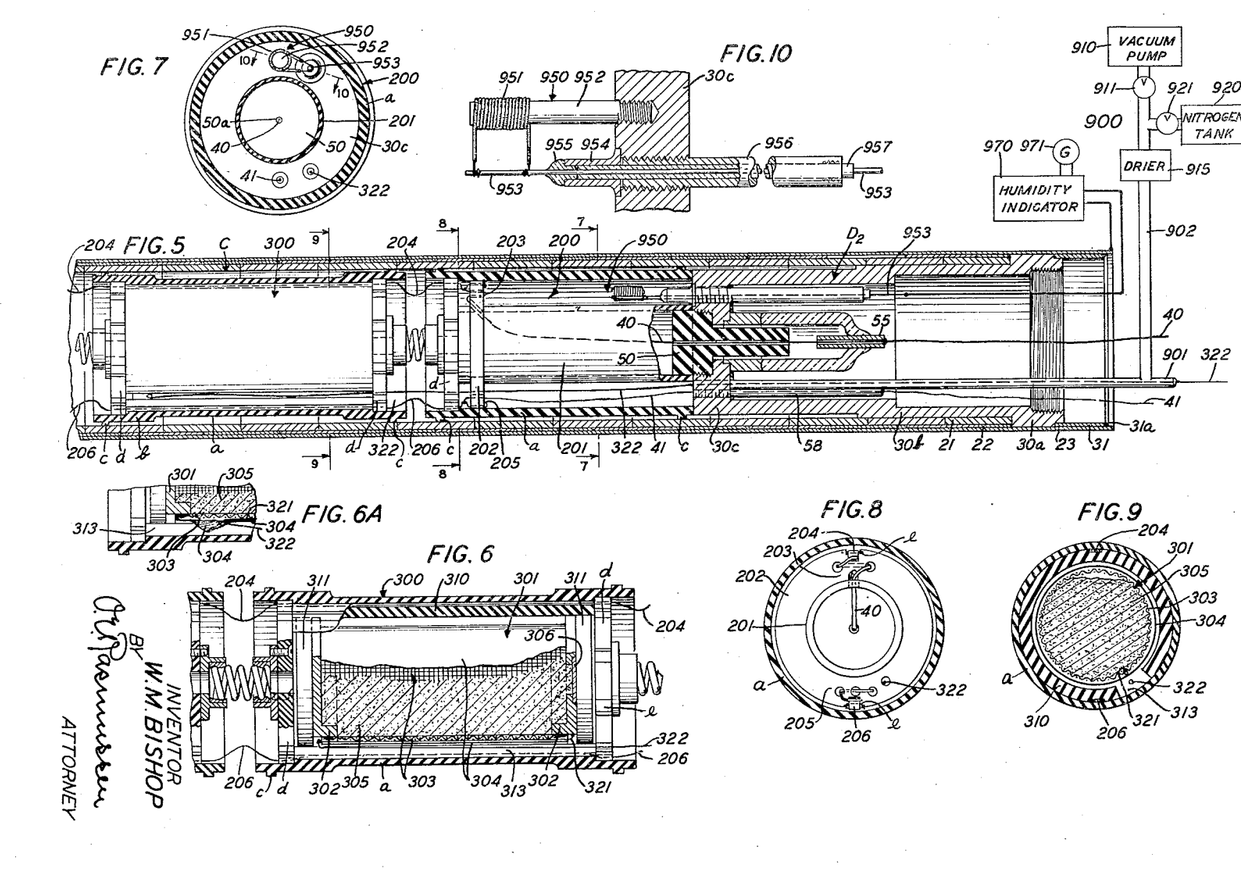
Fig. 5 is a longitudinal sectional view of one end of the housing with the inner seal of the end gland in position. This figure also shows schematically the apparatus for conditioning of the atmosphere in the housing.
Fig. 6 is a detailed view of the drier unit and Fig. 6A shows a portion of the drier unit in the process of being exposed to the atmosphere.
Fig. 7 is a cross-sectional view on line 7—7 of Fig. 5, showing how the connections from exterior apparatus are brought through the end wall of the inner end seal into the interior of the housing.
Fig. 8 is a cross-sectional view on line 8—8 of Fig. 5 through the special end section of the apparatus container, showing the termination of the cable conductor and the ground lead.
Fig. 9 is a cross-sectional view of the drier unit taken on line 9—9 of Fig. 5.
Fig. 10 is a detailed view of the humidity observing unit.

The parts, just described, of the casing and the inner rigid seal are similarly shown in Fig. 5, from which it will appear that with the two inner seals $D_2$ placed in opposite ends of the cylindrical casing C and fixed in position by the steel rings 31, brazed into the outer copper sheath 23, the housing constitutes a complete flexible unit, the interior of which is hermetically sealed off from the surroundings, which is capable of withstanding deep-sea pressure, and which thus is well adapted for protection of the comparatively delicate equipment of a signal repeater contained by the housing.

Reference will now be made more particularly to Figs. 5 to 15 in the drawings, for a detailed description of the apparatus container G inside the housing section C.

Figures 11, 12:
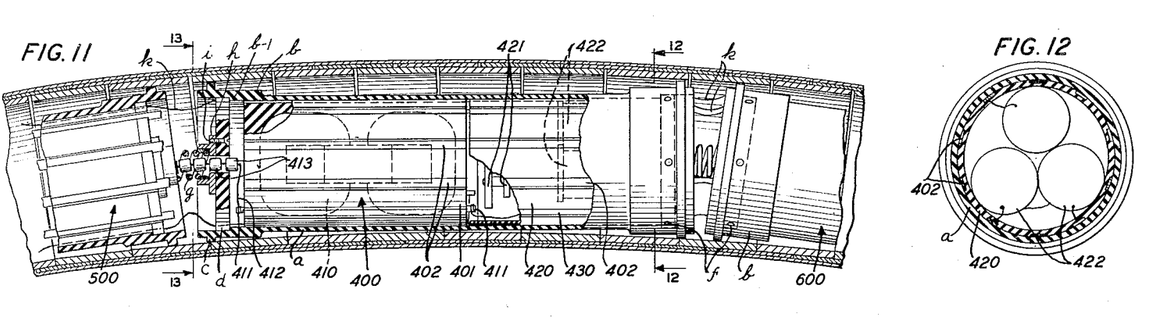
Fig. 11 is a longitudinal sectional view of a portion of the housings, showing a typical apparatus section with apparatus mounted therein, the housing being in flexed condition.
Figs. 12 and 13 are cross-sectional views taken on lines 12—12 and 13—13, respectively, of Fig. 11.
Figure 14:
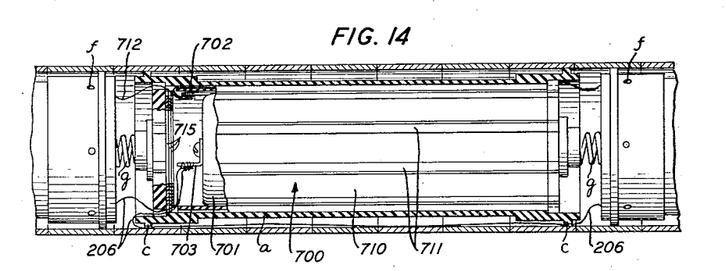
Fig. 14 is a longitudinal sectional view of a portion of the housing, specifically showing a section of the apparatus casing containing a large condenser.
Figure 15:
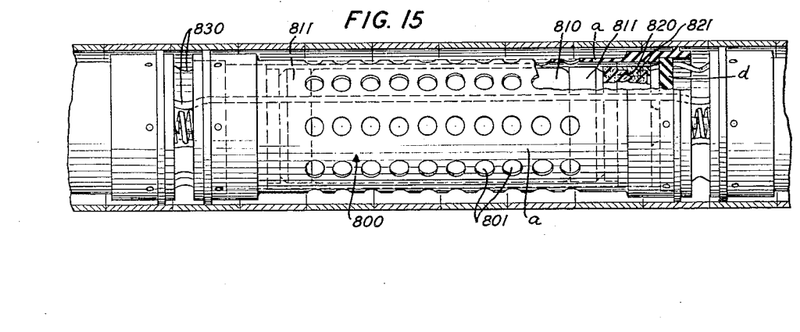
Fig. 15 is a view similar to Fig. 14, but showing specifically a section of the apparatus container for mounting of a vacuum tube.

As already explained in connection with Fig. 1, the apparatus container G includes a plurality of sections, typical ones of which are shown in the drawings by way of example. Thus Fig. 5 shows a special end section 200 for termination of the lead-in conductors from the cable immediately adjacent the inner seal $D_2$; a similar end section is used at the other end of the housing. Fig. 5 also shows a drier unit 300 containing a moisture absorbing agent, this unit being preferably placed next to one of the end sections 200 as shown in Fig. 5. Typical sections 400, 500 and 600 with their interconnections and adapted for housing miscellaneous apparatus are shown in Fig. 11. This figure also shows the apparatus housing in a flexed condition, the housing being bent on the radius of the brake drum. The figure illustrates how the shape of the container section is adapted to the curvature of the housing during flexing, so that the container will not be subjected to strain while the housing is passing over the brake drum. Another container section 700 is shown in Fig. 14, this container being particularly shown as containing a large cylindrical condenser. In Fig. 15 a container section 800 is shown which is particularly adapted for enclosing a vacuum tube.

In general each container section comprises a short cylinder $a$ of an external diameter somewhat smaller than the internal diameter of the steel casing 31; the cylinder $a$ has enlarged end portions $b$ and near each end there is a narrow rim portion or ridge $c$ fitting tightly into the steel casing 21 for the purpose of centering the section within the casing. As will appear from Fig. 11, this particular shape of the cylinder $a$ allows space for the curvature on the inner radius of the steel casing when the housing is passing around the brake drum. The cylinders $a$ are made comparatively short so that they will subtend only a short arc within the steel casing and so that consequently the space within the casing may be efficiently utilized; the length of the sections may, however, differ somewhat to suit the different types of apparatus within the units.

Figure 13:
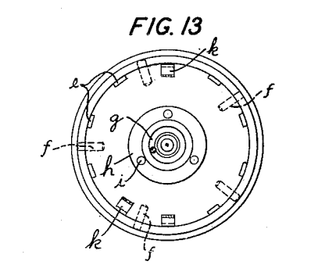
Figure 13A:
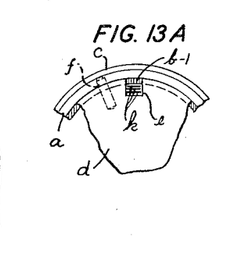
Fig. 13A is an enlarged portion of the view in Fig. 13, showing a bus-bar connection locked in position.

Each apparatus section or capsule is closed at each end by means of an end disc $d$ which rests against a small shoulder $b$—$l$ inside the tube $a$; this disc is shown in detail in Figs. 11, 13 and 13A. It has a number of shallow square cuts $e$ along its periphery for passing connections $k$ from the inside of the capsule to an adjacent capsule. The cylinder $a$ and the disc $d$ are of insulating material and the disc may be fastened in place inside the cylinder, when the cylinder is to be closed up, by means of small pins $f$ also of insulating material.

The circuit connections $k$ are each made up of a few flat strips of copper and may pass through the length of a capsule or may terminate within a capsule in accordance with the requirements of the circuit. In leaving the capsule the connection or bus-bar $k$ passes through a slot $e$, where it is locked down by the inner shoulder $b$—$l$ of the cylinder $a$, so that the strips are unable to pass circumferentially between the disc $d$ and the cylinder $a$. In Fig. 13A the bus-bar $k$ is shown as composed of three parallel strips; however for the sake of clearness, the multiple trip bus-bars are shown as single bars in the other figures.

Adjacent apparatus containers or capsules are joined by means of a flexible coupling arrangement which serves to keep them sufficiently spaced to allow for their relative angular displacement when the housing is bent, as shown in Fig. 11. This flexible coupling comprises a short helical spring $g$ which is fastened between the two end discs $d$ of adjacent cylinders by means of cup-shaped metallic attachment members $h$, which in turn are fastened to the discs by means of screws $i$. The springs $g$ may be secured in position by soldering into the cups $h$.

The end section 200 at each end of the housing, shown in Figs. 5 and 8, comprises the outer cylinder $a$, substantially similar to those of the other sections and having outer guide rims $c$ at each end. This cylinder is closed only at one end by means of an end disc $d$, by which it is flexibly coupled to the adjacent section. The other end of this cylinder $a$ rests directly against the end wall 30c of the inner rigid seal $D_2$ and thus receives the end pressure from all the springs $g$ of the flexible couplings between the various sections of the apparatus container G throughout the whole length of the housing.

The end section 200 further comprises an inner concentric cylinder 201, one end of which fits over the bushing 50 in the end seal $D_2$; the other end abuts against the end disc $d$ and carries a flange 202, shown in detail in Fig. 8, with a plurality of holes for the termination of the cable conductors and for their connection to other apparatus sections.

The lead-out conductor 40 from the cable conductor is passed from the bushing 50 through the inside of the inner cylinder 201 to the set of holes at 203 in the disc 202, where it is threaded in and out to be fastened and is soldered to a bus-bar connection 204 leading to the repeater apparatus. The bus-bar 204 passes from the soldering connection at 203 through one of the notches $e$ in the end disc $d$ and continues over the space between the adjacent apparatus containers with a small bight which permits stretching of the bus-bar when the housing is bent, as shown in the upper side of Fig. 11; the bus-bar 204 enters the adjacent container section or capsule through a similar notch $e$ in the end disc $d$. The ground conductor 41 from the ground post 58 in the rigid seal $D_2$ passes through the annular space between cylinders $a$ and 201 and at a point diametrically opposite to the point 203 at which the conductor 40 is brought out; the conductor 41 is threaded through another set of holes at 205 in the disc 202 to secure it in position and is suitably soldered to another bus-bar connection 206, which passes out of the cylinder 200 through a similar notch $e$, forms a small bight and enters the adjacent capsule through a notch $e$ therein. By this arrangement the central conductor 40 is completely insulated and safely separated from the ground connection and from the metal parts of the steel casing.

The drier section 300 is placed next to the end section 200 at one end of the housing. This section contains a drier unit 301, shown more in detail in Figs. 6, 6A and 9. At the time of its installation in the housing, this unit 301 appears as a completely sealed metallic tubular container which is filled with hydroscopic material. The cylinder has two shouldered metal end pieces 302 and a tube 303 of wire mesh connecting the two end pieces and soldered thereto; the wire mesh surface 303 is completely covered by a metal foil wrapping 304, which also is soldered to the end pieces 302 to completely seal the interior of the unit. The hydroscopic powder 305 may be of any well known kind adapted for absorbing moisture in air or gas in contact therewith; a preferred material is activated "alumina," which is manufactured by Aluminum Company of America. This powder 305 is filled into the unit through an opening in one of the discs 302, which is subsequently sealed by a soldered metal disc 306.

The drier unit 301 is placed inside an insulating cylinder 310 which fits into the cylinder $a$ of the apparatus section 300 and which has two shallow grooves along its outer surface for accommodation of the bus-bar connections 204 and 206 through the entire length of the section 300. The spaces between the end discs $d$ and the ends of the unit are filled with additional insulating discs 311. Provision is made for opening of the drier unit to expose the powder 305 to the atmosphere within the housing after the casing has been closed up by means of the inner seal $D_2$ at both ends of the housing, so that the powder will absorb no moisture until the atmosphere in the housing has been conditioned for operation. For this purpose a piece of thin piano wire is provided, which is arranged as follows: A short length 321 of the wire is soldered to the right end piece 302 as shown in Fig. 6, and is drawn between the wire mesh cylinder 303 and the metal foil cylinder 304 to the opposite end piece 302 to which it is also soldered; the wire is thereafter bent back along the outside of the metal foil cylinder 304 and this outer portion 322 is threaded through holes in the adjacent end discs $d$ of sections 300 and 200, as shown in Fig. 5, is passed through the annular space in section 200 and is brought out through the end seal $D_2$ through a long metal tube 901, so that the end of the wire will be accessible outside the housing. Wire 322 is temporarily soldered into the end of the tube 901 for sealing of this tube until the atmosphere within the housing has been conditioned. With the arrangement as shown in Fig. 5 and after the atmosphere within the housing has been properly conditioned, the wire 322 is unsoldered at the end of the tube 901 and is grabbed and pulled with the effect that the wire is first pulled out of the soldering on the left disc 302 and rips open the metal foil cylinder 304 lengthwise of the drier unit; the wire is then pulled out of the soldering point on the right end disc 302 and is pulled clear out through the tube 901, which thereafter may be pinched off and sealed. To facilitate the ripping of the metal foil a wide opening 313 is made through the length of the insulating cylinder 310 surrounding the drier unit. The piano wire is purposely arranged as far away as possible from the bus-bar 204 and the terminal arrangement at 203 and thus may be arranged adjacent to the ground connection 206 as shown in Figs. 8 and 9. Though the drier unit is enclosed in the insulating cylinder of the section 300 there are enough leakage paths, as for example through the notches $e$, to provide communication between the atmosphere of the housing and the hydroscopic powder 305 within the drier unit.

As will appear from Figs. 11 and 14, the apparatus within the individual sections are generally contained in a cylindrical insulating body fitting snugly into the cylinder $a$ and having grooves in their outside surfaces for location of the bus-bar connections $k$, these grooves lining up with the notches $e$ in the end discs $d_1$ for passing of the bus-bar connections between adjacent apparatus sections.

Thus in Fig. 11 there is shown an apparatus section 400 which is typical of the general arrangement of different apparatus in a section.

In the left half of the section 400 the cylinder $a$ may be filled with a solid insulating cylinder 401 having grooves 402 in its outside surface for bus-bar connections. The cylinder or block 401 may be divided longitudinally into two or more parts and is carved out to fit tightly about the apparatus inside the block, which in the present case may be a transformer 410; connecting terminals for the transformer may be brought out at either or both ends of the block, such as terminal 411. In the case where it is important to reduce the distributed capacitance between a conductor from an adjacent apparatus section and the metal parts of the housing or the other connections along the periphery inside the cylinder $a$, it may be desirable to utilize an arrangement as shown for the left-hand terminal 411 from the transformer 410 in Fig. 11, according to which a connection is brought through holes in the center of the disc $d$, and in the cup-shaped attachment member $h$, through the center of the helical spring $g$ and then into the interior of the adjacent section 500. For this purpose the wire connection 412 is threaded through a string of insulating beads 413 as a precaution against accidental grounding of the normally insulated spring $g$ or member $h$.

In the right half of the section 400, a number of pieces of different apparatus may be mounted such as small condensers 421 and resistances 422. This apparatus may be suitably fastened together and placed within a hollow insulating cylinder 430, with longitudinal grooves 402 on its outside surface for bus-bar connections. Interconnection between this apparatus may be made inside of the cylinder 430 whereas terminal connections to adjacent apparatus sections are brought out to bus-bar connections $k$ carried across the gaps between adjacent apparatus sections, as already described.

The section 700 shown in Fig. 14 is particularly adapted for mounting of a large cylindrical condenser 701 one end of which is shown exposed at the left in the section. The condenser is of cylindrical shape and nearly fills the entire space inside the cylinder $a$. The condenser has an outside metal casing serving as one electrode to which is attached a terminal 702 at the periphery of the condenser. The other terminal 703 is attached at the center of the condenser and insulated from the condenser casing. The condenser is enclosed within a thin cylinder 710 of insulating material and having grooves 711 in the outer surface thereof for accommodation of bus-bar connections passing through the section 700.

With one terminal of the condenser connected to ground, the ground bus-bar 206 is passed on the outside of cylinder $a$ through notches in the ridges $c$ and brought inside the left-hand end of the section 700, as shown in the drawings, for soldering to the central terminal 703 of the condenser; the bus-bar 206 may be continued on to the next section in the manner as described in connection with Fig. 5. The other terminal 702 of the condenser is connected to a bus-bar connection 712 passing between the outer cylinder $a$ and the inner cylinder 710 which may be at a fairly high potential relative to ground and may be directly connected through the bus-bar 204 from the cable conductor 40. There will be little potential difference between the outer metal casing of condenser 701 and the bus-bar 712 passing through the unit 700, and the ground potentials are well separated from the casing of the condenser to reduce the distributed capacitance between these elements.

A plurality of shims 715 of insulating material may be placed at either or both ends of the condenser to fix the condenser in position within the section 700.

The vacuum tube section 800 shown in Fig. 15 contains a vacuum tube 810 of a slightly smaller diameter than the inside diameter of the cylinder $a$. The vacuum tube has a mounting piece 811 at each end for terminal connections and each end is supported in a sponge rubber cushion 820 mounted in an insulating ring 821 fitting into the end of the cylinder $a$. The cylinder $a$ has rows of holes 801 through its wall opposite the surface of the vacuum tube to provide circulation of the nitrogen atmosphere heated by the hot cathode or heater filament in the vacuum tube. Bus-bar connections passing through the section 800, such as the bars 830, are guided by the end discs $d$ to pass along the annular space between the vacuum tube and the cylinder *a* and between adjacent rows of holes 601.

All the apparatus within the apparatus housing C, having surfaces exposed to the nitrogen atmosphere, are made of metal and of insulating materials which are characterized by great stability during long periods of years. The cylinders *a* and their end pieces *d*, as well as the bushing 50 at each end of the housing, may be of hard rubber vulcanized to have substantially no free sulfur, the object being to avoid reaction between the rubber and adjacent metal parts. Another suitable insulating material for these elements is "Lucite," a methyl methacrylate plastic.

This material may readily be machined and due to its fair degree of flexibility has little tendency to crack or break. Its softening temperature is well above the highest temperature that can prevail around the vacuum tube on the sea bottom. Information about its composition and properties will be found in the following articles in Industrial and Engineering Chemistry: March 1936, page 267; "Acrylic resins" by H. T. Neher; October 1936, page 1160; "Methacrylate resins" contribution from E. I. du Pont de Nemours Company; April 1939, page 382; "Methacrylate resins" by Strain, Kennelly and Dittmar.

In assembling the apparatus housing and contained apparatus, different methods may, of course, be used. The arrangement of the sectionalized apparatus container in accordance with the invention has the advantage that the container and the steel casing may be assembled progressively at the same time, so that the assembled portion of the apparatus container may be progressively covered by addition of steel rings for the casing without interference with the assembling of additional apparatus, the assembled sections being in their proper position as soon as the casing is extended over them and thus being ready for sealing of the housing when the end seals $D_2$ are placed in position to close the housing. As in the case of most of the apparatus, such as that shown in Figs. 11 and 14 for the units 400 and 700, the apparatus is assembled within the inner grooved cylinders and is interconnected as well as connected to bus-bars located in the grooves of the inner cylinder and extending from an adjacent already assembled section. The outer cylinder *a* is then placed in position and is closed up by an end disc *d* forming part of an assemblage constituted of two such discs *d* with the intermediate spring *g* soldered in position. Two adjacent sections, such as 400 and 600 in Fig. 11, are coupled together in this manner by a flexible unit comprising two end discs *d* and the discs are locked in position by means of the pins *f*. Each time a completed section has been connected up additional steel rings 22 and 23 may be placed over the section to protect it against further disturbances. After the end sections 200 have been connected up, the steel casing may be completed and the copper sheathing 23 slid over the entire length of the housing.

The inner rigid end seals $D_2$ with the steel rings 31 braced in position thereon, are then inserted in the opposite ends of the housing and the steel rings 31 are braced to the copper sheathing 23 at the points 31a to provide the temporary unitary arrangement shown in Fig. 5. Conductor 40 having been threaded through the "Kovar" seal and conductor 41 through the post 58, these conductors are soldered so that the bores are completely sealed up. The piano wire 322 for the drier unit at the end of the housing shown in Fig. 5 having been threaded through the tube 901, this wire is soldered into the end of the tube to seal the opening. At the end of the housing shown in Fig. 5, the interior of the housing is now in communication with the outside only through the tube 901 which has a branch 902 to the conditioning equipment 900. The seal $D_2$ at the opposite end of the housing is entirely sealed up.

For the purpose of conditioning the atmosphere within the housing, a vacuum pump 910 is connected through a valve 911 to the pipe 902 through a drying equipment 915. The housing is now evacuated for a sufficient time to remove the air and to remove substantially all volatile substances from the surfaces of the apparatus contained in the housing. The vacuum pump is then shut off and the nitrogen tank 920 is connected through a valve 921 through the pipe 902 admitting nitrogen to the housing. The nitrogen is purified and is passed through the drier 915 to insure against moisture entering the housing.

The piano wire 322 is now unsoldered from the pipe 901 and is pulled out of the housing, thereby exposing the drier agent 305 in the drier unit 300 to the atmosphere within the housing. The tube 901 is then cut off inside the seal $D_2$ about even with the ground post 58 and is sealed up by soldering. The housing C is now completely sealed up and is ready for insertion of the outer seals $D_1$ in each end.

Provision is made for observation of the humidity inside the casing during the conditioning period. For this purpose a humidity observing unit 950 is mounted on the rigid wall 30c of one of the end seals $D_2$ to project into the annular space in the end section 200. This unit is shown in detail in Figs. 7 and 10.

The unit 950 comprises a coil 951 of cotton insulated copper wire wound tightly upon a metal post 952 screwed into the end plates 30c. The two ends of the coil 951 are soldered to another post 953 to fix the coil 951 definitely in position on the post 952 and to establish an electrical connection with the copper wire of the coil 951. The post 953 is mounted in a "Kovar" bushing, the metal bushing 954 of which is soldered into a recess in the plate 30c. The "Kovar" metal post 953 passes through the glass bead 955 and is brought out through the plate 30c through a metal tube 956 screwed into the plate 30c. The "Kovar" wire 953 is temporarily insulated from the tube 956 by means of a glass tube 957.

Connection is now made to the post 952 through the apparatus housing and the copper sheathing 23 and from the wire 953 to a suitable humidity indicator, as shown in Fig. 5, which includes a source of potential 971 for applying a fixed potential to the posts 952 and 953, thereby subjecting the cotton insulation of the coil 951 to dielectric stress. The indicator 970 may then indicate the insulation resistance and variations therein of the cotton insulation of coil 951.

As is well known the insulation resistance of cotton varies in a definite relation to the amount of moisture absorbed by the cotton; this relation thus may serve to give an indication on a properly calibrated meter of the atmospheric condition surrounding the coil 951. The coil 951 is, of course, uncoated so that the cotton will freely absorb moisture from the atmosphere.

The humidity readings may, of course, be taken at different times during the conditioning of the atmosphere in the housing, but it is particularly important that observations be made immediately before and after the nitrogen has been admitted to the housing. In this manner it is assured that little or no moisture which would further electrolytic action between dissimilar materials is present in the housing at the time of sealing the housing.

After the humidity readings have been completed, the wire 953 is cut off at the end of the tube 956 and the glass tube 957 is removed. Thereafter a screw 958, shown in Fig. 2, is screwed into the end of the tube 956 and soldered in to seal the tube. By this precaution no reliance need be placed on the "Kovar" seal 955 to withstand the sea pressure in case the outer elastic seal $D_1$ should break down.

Figure 3:
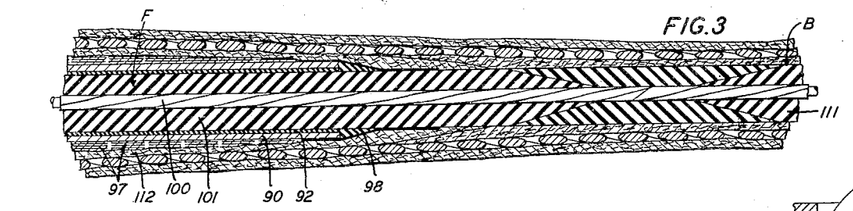
Fig. 3 is a longitudinal sectional view of the junction between the stub cable from the housing and one end of the submarine cable.

Referring now more particularly to Figs. 2 and 3 the outer semirigid or semielastic seal $D_1$ comprises a center conducting tube 61 of brass, having a small bore for threading the lead-out wire 40 therethrough. About an intermedial portion of the center tube 61 there is concentrically located an outer gland tube 81 of brass, having generally a cylindrical form with external shoulder portions 81a and 81b. A gland bushing 80 of hard rubber is mounted in the inner end of the gland tube 81 by means of a gland nipple 82 of brass screwed into shoulder portion 81b. The space between the brass tubes 61 and 81 and between the tube 61 and bushing 80 is filled with a semirigid insulating compound 62 which is vulcanized to closely adhere to the contiguous brass surfaces. The bushing 80, by means of its conical bore and in conjunction with the center tube 61, provides a rigid backing for the elastic insulating gland 62 against high sea pressure. In this manner a long continuous insulating seal is provided which may be depended upon to exclude the sea water both under low and high pressures.

When the outer seal $D_1$ in inserted into the inner seal $D_2$ of the housing, the metal spacer ring 75 is first slipped over the inner end of the sealing unit $D_1$, and a center tube support 70 is attached to the inner threaded end of the center tube 61 and screwed tightly against the spacer ring 75. The support 70 is in the form of a heavy hard rubber disc having brass nuts set therein for screwing onto the center tube 61; the support 70 further has one or more passages 72 for providing communication between the spaces within the sealing chamber 34 of the gland D on both sides of the support.

Figure 4:
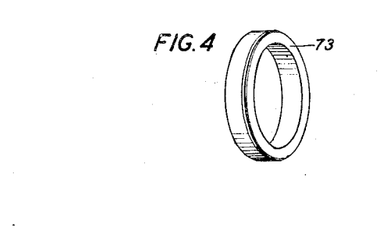
Fig. 4 is a perspective view of a detail in the sealing gland.

The support 70 has a cut-out portion along its periphery for accommodation of an annular air chamber 73. The shape of this chamber is shown in Fig. 4. The chamber is preferably formed into an annular ring having a substantially rectangular cross section; the ring is made of thin sheet metal, such as copper, enclosing an annular space hermetically sealed in. This chamber provides a cushioning effect for the glass seal 51 against increasing pressure on the chamber 34 due to extrusion of the insulation 62 into the chamber 34, as in the case of a partial physical breakdown of the outer elastic seal.

A shoulder ring 74 is next placed against an inner shoulder of the end plug 30 and the completed sealing unit $D_1$ is then inserted and screwed tight against ring 74 by means of the threads in the outer shoulder portion 81b of the gland tube 81 and in the shoulder portion 30a of the end plug 30.

The lead-out wire 40 having been threaded through the center tube 61 to leave a bight 40a within the sealing chamber 34, is soldered in the outer end of the bore of tube 61 and cut off, thereby forming a hermetic seal.

Each of the connecting cable sections E and F is in the form of a submarine cable core, having a central conductor 100 surrounded by core insulation 101, which preferably is of the same material as that used for the core insulation 111 of the submarine cable.

For the purpose of facilitating the splicing of the connecting cable section F to the outer end of the insulating gland 62 of the entrance seal, the gland insulation 62 is extended, in the process of making the seal, by a short piece of core insulation 63 surrounding the center tube 61 and preferably being of the same material as that of the insulation 101 on the stub cable F.

The ends of the insulation 63 and insulation 101 are tapered for splicing and conductor 100 is joined to the center tube 61; the splicing compound 102 is filled into the splicing space and the splice may be completed in accordance with well-known cable practices.

An outer core sleeve or tube 90, having at its inner end an annular tube support 91, is now passed over the stub cable F and over the inner splice 102 and screwed tight into the shoulder portion 81a of the gland tube 81. The inner diameter of the tube 90 is slightly larger than that of the connecting core F and the tube support 91 is dimensioned to leave an inner clearance between it and the gland tube 81 so that a continuous annular space 92 is formed about a substantial length of the stub cable core F of say 3 to 10 feet, or more, depending on the size of the cable. The wall thickness of the tube 90 is such that it will be sufficiently pliable to readily comply with the bending of the whole housing structure and the cable, as they pass over the paying-out sheave and the brake drum on the cable ship during laying operations.

However, in accordance with the invention a considerable portion of the tube 90 near the end attached to the seal $D_1$ is transversely corrugated for the purpose of increasing its flexibility and to overcome a tendency to break near the fastening point at the tube support 91. The corrugations may be formed in different manners, but in the preferred form the corrugations are formed as deep annular grooves 90a extending beyond the diameter of the tube proper and with an inner diameter equal to the inner diameter of the tube.

As shown in Fig. 3 the outer end of the annular space 92 is closed by means of an elastic tubular sleeve 98 slipped over the outer end of the tube 90 and over the core insulation 101.

The inner voids of the sealing chamber 34 in the end gland D and the outer annular space or reservoir 92 may now be filled with a noncompressible fluid insulating compound. For this purpose filling tubes 85, 86, and 94 of lead or soft copper are provided which thereafter are cut off and sealed up, as shown in the drawings, by a filling of solder 33 within the edge of the copper sheathing 23.

A coating of copper 96 is applied to form a continuous impervious sealing surface extending a short distance over the outer surface of the end of the copper sheathing 23, over the surface of the solder 33, the exposed outer surface of the brass tube support 91 and a short distance over the outer surface of the copper core sleeve 90. This coating of copper may be applied in any convenient manner as by spraying or by electroplating, and by covering the surfaces of these dissimilar metals serves to prevent electrolytic action in the presence of the sea water.

The large diameter of the housing is gradually reduced along the stub cable sections E and F to the diameter of the cables A and B by means of a plurality of filler rings 97 of successively diminishing outer diameters. For this purpose the space between the corrugations of the core sleeve 98 may be filled with jute or similar material. Each ring 97 may be made up of a spiral winding of copper tape with the required number of turns to provide the desired taper. An even layer of jute 112 is then applied over the unit, leaving free ends of the sections E and F for splicing.

The housing with its stub cables may now be spliced into the submarine cable and the steel armoring extended over the stub cables and the housing.

Figure 16:
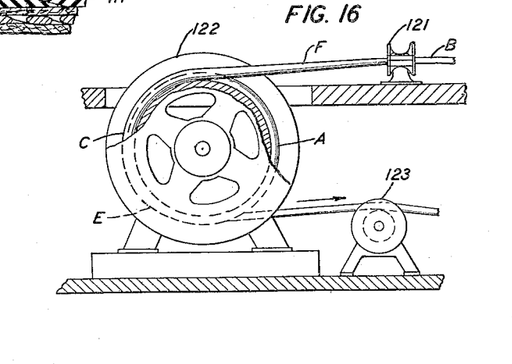
Fig. 16 is a fragmentary view of conventional machinery on board a cable ship for paying out a submarine cable into the ocean, showing particularly a cable portion including a repeater housing in the course of passing about the brake-drum controlling the speed of the cable.

Due to the gradual taper of the outer surface of the stub cable the housing may readily be passed through the various eyelets and guide pulleys on board ship during the laying operation. For the purpose of controlling the speed of paying-out of the cable, the cable is made to pass several times around a brake drum. This arrangement is diagrammatically illustrated in Fig. 16 where the cable is shown to pass through an eyelet 121 on an upper deck to the brake drum 122 on a lower deck. The cable passes around the drum a few times and then proceeds over a pulley 123 which leads to the dynamometer and the paying-out sheave. Fig. 16 shows the sections B, F, C, E and A of Fig. 1 in the processes of passing about the brake drum. Since the brake drum may not be more than about six feet in diameter, it is evident that the housing structure will be subjected to bending on a comparatively small curvature in passing about the brake drum.

What is claimed is:

1. A flexible elongated apparatus housing comprising a long tubular casing capable of being flexed transversely of its axis, and a long sectionalized tubular apparatus container within said casing having rigid tube sections and flexible joints between said sections, said apparatus container being generally of a diameter smaller than the inner diameter of said casing to permit flexing of said housing and having ridges at intervals along its length of a diameter to fit closely inside said casing.

2. A flexible elongated apparatus housing comprising a long tubular casing capable of being flexed transversely of its axis, and a long sectionalized tubular apparatus container within said casing having rigid tube sections and flexible joints between said sections, said apparatus container being generally of a diameter smaller than the inner diameter of said casing to permit flexing of said housing and having external projections for centering said sections within said casing and spaced apart in the lengthwise direction of said container to provide space for said casing to curve inwardly between them when it is flexed.

3. A flexible elongated apparatus housing comprising a long tubular metal casing capable of being flexed transversely of its axis, and a plurality of rigid cylindrical mounting elements within said casing adapted to enclose and mount apparatus and having flexible end pieces for coupling them into a continuous series with sufficient freedom of relative movement of said mounting elements to relieve said elements of strain when said casing is flexed each of said mounting elements having an external guiding portion for providing a sliding fit within said casing and another reduced portion for providing space for flexing of said casing.

4. A flexible elongated apparatus housing comprising a long tubular metal casing capable of being flexed transversely of its axis, and a plurality of rigid cylindrical mounting elements within said casing adapted to enclose and mount apparatus and having flexible end pieces for coupling them into a continuous series with sufficient freedom of relative movement of said mounting elements to relieve said elements of strain when said casing is flexed, each of said mounting elements having enlarged portions near their ends for the centering thereof within said casing and having a reduced center portion for providing space for flexing of said casing.

5. A flexible elongated apparatus housing comprising a long tubular metal casing capable of being flexed transversely of its axis, and a plurality of rigid cylindrical mounting elements within said casing adapted to enclose and mount apparatus and having flexible end pieces for coupling them into a continuous series with sufficient freedom of relative movement of said mounting elements to relieve said elements of strain when said casing is flexed, each of said cylindrical mounting elements being generally of a diameter smaller than the inner diameter of said housing to permit flexing of said housing and having outer projecting portions for a sliding fit into said housing.

6. A flexible elongated apparatus housing comprising a long tubular metal casing capable of being flexed transversely of its axis and having a rigid end seal at each end, and a plurality of rigid cylindrical mounting elements within said casing adapted to enclose and mount apparatus and having end pieces for coupling them into a continuous series extending throughout the length of said casing to engage both of said end seals, said mounting elements being generally of a diameter smaller than the inner diameter of said casing and having outer spaced projecting portions fitting slidably into the inner cylindrical surface of said casing, and said end pieces including a flexible connecting member for permitting transverse movement of each mounting element relative to adjacent mounting elements and to exert an end pressure on all of said mounting elements and on said end seals.

7. A flexible elongated apparatus housing comprising a long tubular metal casing capable of being flexed transversely of its axis and having a rigid end seal at each end, and a plurality of rigid cylindrical mounting elements within said casing adapted to enclose and mount apparatus and having end pieces for coupling them into a continuous series extending throughout the length of said casing to engage both of said end seals, said mounting elements being generally of a diameter smaller than the inner diameter of said casing and having outer spaced projecting portions fitting slidably into the inner cylindrical surface of said casing, said projecting portions being formed into ridges, one at each end of said elements and loose fitting within said casing, and said end pieces being formed into end walls for said elements and fastened thereto to fix the contained apparatus in position and including a flexible connecting member for permitting transverse movement of each mounting element relative to adjacent mounting elements and to exert an end pressure on all of said mounting elements and on said end seals.

8. A flexible elongated apparatus housing comprising a long tubular metal casing capable of being flexed transversely of its axis and having a rigid end seal at each end, and a plurality of rigid cylindrical mounting elements within said casing adapted to enclose and mount apparatus and having end pieces for coupling them into a continuous series extending throughout the length of said casing to engage both of said end seals, said mounting elements fitting slidably into the inner cylindrical surface of said casing, and said end pieces including a flexible connecting member for permitting transverse movement of each mounting element relative to adjacent mounting elements and to exert an end pressure on all of said mounting elements and on said end seals, each of said mounting elements comprising a rigid hollow cylinder having an outer enlarged ridge portion near each end slidably fitting into said casing and each of said end pieces including two end discs for closing adjacent ends of two adjacent cylinders, a short helical spring mounted between said end discs, a cup-shaped member attached centrally to each of said end discs for receiving the corresponding end of said spring, and a flexible insulated conductor passing inside said spring and through bores in said members and end discs for connection between apparatus in said cylinders.

9. A flexible elongated apparatus housing comprising a long tubular metal casing capable of being flexed transversely of its axis and having a rigid end seal at each end, and a plurality of rigid cylindrical mounting elements within said casing adapted to enclose and mount apparatus and having end pieces for coupling them into a continuous series extending throughout the length of said casing to engage both of said end seals, said mounting elements fitting slidably into the inner cylindrical surface of said casing, and said end pieces including a flexible connecting member for permitting transverse movement of each mounting element relative to adjacent mounting elements and to exert an end pressure on all of said mounting elements and on said end seals, each of said mounting elements comprising a rigid hollow cylinder appreciably smaller in diameter than the inside of said casing and with an outer enlarged ridge portion near each end of said cylinder for centering it within said casing, and each of said end pieces including two discs for closing adjacent ends of two adjacent cylinders, an attachment member attached to each of said discs and an intermediate short spring fastened in said two attachment members to provide a variable narrow spacing between said adjacent cylinders and to permit relative transverse movement of said adjacent cylinders when said housing is flexed.

10. A flexible deep-sea repeater housing for a submarine cable comprising a long tubular metal casing which is pressure-resistant, hermetically sealed and capable of being flexed transversely of its axis and which includes an entrance seal at each end for the cable conductors which presents a rigid end-closure to the inside of said casing, and a flexible tubular apparatus container extending the whole distance between said entrance seals within said casing for enclosing repeater apparatus connected between the cable conductors at opposite ends of said casing, said container being of insulating material and having a series of spaced ridges about its outer surface in slidable fit with the inside surface of said casing.

11. A repeater housing in accordance with claim 10 in which said casing is sectionalized to permit flexing and permit it to be progressively assembled about said container and in which said container is sectionalized to permit flexing and permit it to be assembled progressively with said casing.

12. A flexible deep-sea repeater housing for a submarine cable comprising a long tubular metal casing which is pressure-resistant, hermetically sealed and capable of being flexed transversely of its axis and which includes an entrance seal at each end for the cable conductors presenting a rigid end-closure to the inside of said casing, and a flexible tubular apparatus container extending the whole distance between said entrance seals within said casing for enclosing repeater apparatus connected between the cable conductors at opposite ends of said casing, said container being of insulating material and having a series of spaced ridges about its outer surface in slidable fit with the inside surface of said casing, said apparatus container comprising a series of rigid tubular sections and flexible coupling elements between said sections, each of said sections having at each end one of said ridges and an end-disc substantially closing the interior of said section for fixing the contained apparatus in position, said container including longitudinal bus-bar connections for interconnection of repeater apparatus within said sections and disposed in spaced parallel arrangement along the inner tubular surface of said sections, said end discs being of insulating material and having peripheral cuts for circumferential spacing of said bus-bars and for passing said bus-bars to an adjacent section, and said bus-bars having bent portions between said adjacent sections to permit flexing of said housing without strain on said bus-bars.

13. A series of apparatus containing cylindrical capsules including flexible spacing units for flexibly spacing and joining said capsules end to end and adapted to be progressively assembled, electrical connections between apparatus in the different capsules, said capsules being of insulating material and adapted to pass said connections through the interior of said capsules, an outer sea-pressure-resistant cylindrical casing build up of a succession of telescoped cylindrical metal rings adapted to be progressively assembled about said series of capsules, two hermetic seal-fittings each with a lead-in connection for the apparatus in said capsules and fitted into the ends of said housing and in pressure engagement with the ends of said series of capsules, and an outer impermeable cylindrical metal sheath substantially tight fitting on said rings and hermetically sealed to said seal-fittings to form a unitary flexible assemblage.

14. A deep-sea cable repeater housing comprising a long hermetically sealed tubular metal casing capable of withstanding sea-pressures and of being flexed transversely of its axis and having a rigid hermetic entrance seal at each end for the cable conductors, a long sectionalized tubular apparatus container extending within and throughout the length of said casing and capable of being flexed with said casing, and a multiplicity of repeater apparatus distributed along the interior of said container, the materials in all surfaces presented to the atmosphere within said casing being substantially non-reactive in mutual contact and having substantially all normally volatile constituents removed from their surface portions, and said casing enclosing an atmosphere of purified inert gas and also enclosing a quantity of drying agent in contact with said atmosphere.

15. A deep-sea cable repeater housing comprising a long hermetically sealed tubular metal casing capable of withstanding sea-pressures and of being flexed transversely of its axis and having a rigid hermetic entrance seal at each end for the cable conductors, a long sectionalized tubular apparatus container extending within and throughout the length of said casing and capable of being flexed with said casing, and a multiplicity of repeater apparatus distributed along the interior of said container, a section of said sectionalized container near one of said entrance seals containing a drier unit for drying the atmosphere within said casing under operating conditions, said drier unit comprising an initially sealed chamber, a quantity of drying agent within said chamber and a pull-strand extending through a bore in said entrance seal for opening of said sealed chamber to expose said drying agent to the atmosphere in said casing after said entrance seal has been placed to close said casing.

16. A deep-sea cable repeater housing comprising a long hermetically sealed tubular metal casing capable of withstanding sea-pressures and of being flexed transversely of its axis and having a rigid hermetic entrance seal at each end for the cable conductors, a long sectionalized tubular apparatus container extending within and throughout the length of said casing and capable of being flexed with said casing, and a multiplicity of repeater apparatus distributed along the interior of said container, a section of said sectionalized container near one of said entrance seals containing a drier unit for drying the atmosphere within said casing under operating conditions, said drier unit comprising an initially sealed chamber, a quantity of drying agent within said chamber and a pull-strand having one end extending through a bore in said entrance seal for opening of said sealed chamber to expose said drying agent to the atmosphere in said casing after said entrance seal has been placed to close said casing, said sealed chamber of said drier unit further comprising an inner cylindrical shell of wire mesh for holding said quantity of drying agent, and an outer initially sealed cylindrical shell of metal foil, said pull-strand having its other end fastened to said sealed chamber and extending an appreciable distance between said inner and outer shells to rip said outer shell open when said strand is pulled before the assembled housing is sealed up.

17. A deep-sea cable repeater housing comprising a long hermetically sealed tubular metal casing capable of withstanding sea-pressures and of being flexed transversely of its axis and having a rigid hermetic entrance seal at each end for the cable conductors, a long sectionalized tubular apparatus container extending within and throughout the length of said casing and capable of being flexed with said casing, a multiplicity of repeater apparatus distributed along the interior of said container, and a humidity observing unit mounted to be exposed to the atmosphere within said casing while said atmosphere is being conditioned before sealing up of said casing, said observing unit comprising a moisture absorbent insulating member, two conducting members in constant pressure contact with opposite sides respectively of portions of said insulating member, said conducting members having electrical connections extending through one of said entrance seals for connection to apparatus for observation of the insulating properties of said insulating member as affected by the atmosphere during its conditioning.

18. A deep-sea cable repeater housing comprising a long hermetically sealed tubular casing capable of withstanding sea-pressures and of being flexed transversely of its axis and having a rigid hermetic entrance seal at each end for the cable conductors, a long sectionalized tubular apparatus container extending within and throughout the length of said casing and capable of being flexed with said casing, a multiplicity of repeater apparatus distributed along the interior of said container, a humidity observing unit mounted to be exposed to the atmosphere within said casing and comprising a metal post, a plurality of turns of cotton-covered wire wound tightly upon said post, a conducting connection from said wire, a hermetic glass seal for passing said connection through said entrance seal, and a conducting connection from said post, said conducting connections being for connection to apparatus for observation of the insulating properties of the cotton on said wire as affected by the humidity of the atmosphere within said casing, said apparatus including a source of predetermined voltage.

19. In a method of preparng a deep-sea cable repeater housing for operation, the steps of closing said housing with an entrance seal for a lead-in conductor, of evacuating the interior of said housing through a passage in said entrance seal for removal of a substantial portion of volatile substances from the surfaces within said housing, of then admitting dry purified nitrogen to the interior of said housing, of testing over conductors passed through said entrance seal the dielectric property of a test member of cotton located within said housing for calibrated determination of the humidity of the nitrogen atmosphere within said housing, of then permanently exposing to said atmosphere an initially enclosed drying agent located within said housing by pulling a strand extending through said entrance seal to open the enclosure for said agent, and of entirely sealing all passages through said entrance seal.

20. A housing for an electrical element to be incorporated in a deep-sea cable and a rigid cylindrical container for said element enclosed in said housing and being of a diameter smaller than the inner diameter of said housing to permit transverse flexing of said housing and having an enlarged rim portion near each end for a sliding fit within said housing.

21. A flexible deep-sea repeater housing for a submarine cable comprising a long tubular metal casing which is pressure-resistant, hermetically sealed and capable of being flexed transversely of its axis and which includes an entrance seal at each end for the cable conductors presenting a rigid end-closure to the inside of said casing, and a flexible tubular apparatus container extending the whole distance between said entrance seals within said casing for enclosing repeater apparatus connected between the cable conductors at opposite ends of said casing, each of said entrance seals including an elongated flexible core sleeve having one end fastened to the rigid structure of said entrance seal and extending to surround an end portion of the core of said cable connected to said seal, said sleeve being of soft metal and having a series of transverse corrugations at its fastened end to increase its flexibility.

22. A flexible deep-sea repeater housing for a submarine cable comprising a long tubular metal casing which is pressure-resistant, hermetically sealed and capable of being flexed transversely of its axis and which includes an entrance seal at each end for the cable conductors presenting a rigid end-closure to the inside of said casing, and a flexible tubular apparatus container extending the whole distance between said entrance seals within said casing for enclosing repeater apparatus connected between the cable conductors at opposite ends of said casing, each of said entrance seals including an elongated flexible metal core sleeve having one end fastened to the rigid structure of said entrance seal and extending to surround an end portion of the core of said cable connected to said seal, said sleeve having a series of transverse corrugations at its fastened end to increase its flexibility.

23. A flexible deep-sea repeater housing unit adapted for connection into an armored submarine cable and comprising a long, transversely flexible metal casing; terminal pieces for connection of said casing to the adjacent cable ends; and an over-all armoring for said casing and terminal pieces adapted for incorporation into the cable armoring; said casing including an insulating container extending the whole distance within said casing for enclosing repeater apparatus and circuit connections therefor and also including a short rigid seal at each end; each of said terminal pieces including a short semi-rigid seal, a stub cable core for connecting the repeater apparatus through said seal to one cable end, and an elongated flexible core sleeve attached to said rigid seal and extending over a portion of said stub cable core; said container being sectionalized and being generally of a diameter smaller than the inside diameter of said casing to increase the flexibility of said housing unit, and said core sleeve being transversely corrugated to increase the flexibility of said unit.

WALTER M. BISHOP.